May 14, 1957
G. L. DE WOLF
2,792,510
MOTOR STRUCTURE
Filed Jan. 25, 1956
2 Sheets-Sheet 1
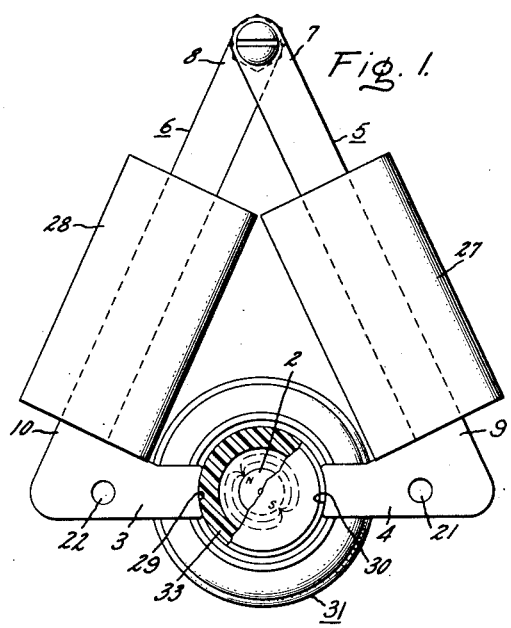
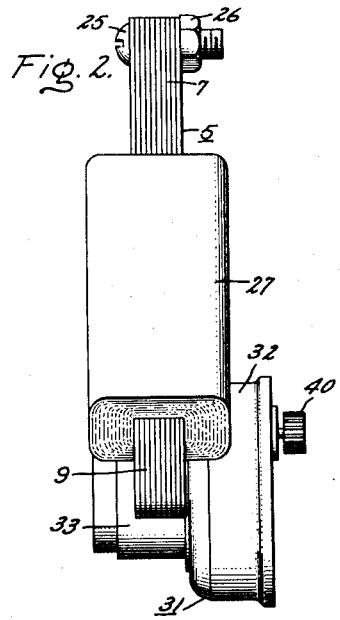
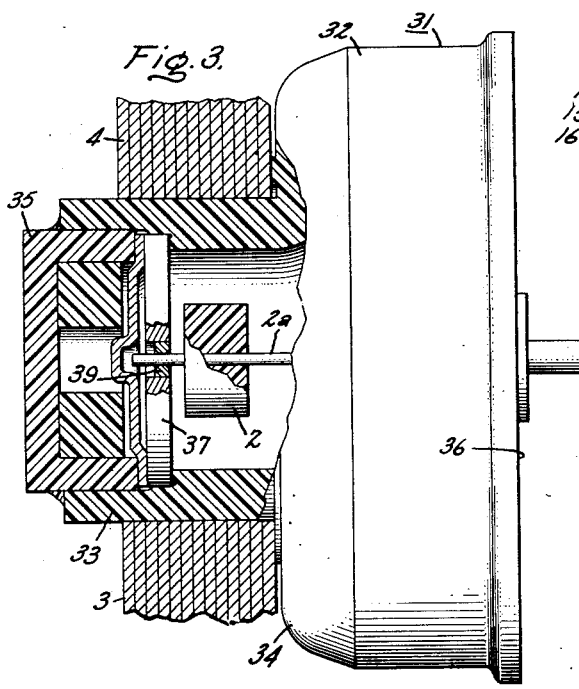
Inventor:
George L. deWolf,
by Lawrence R. Kempton
His Attorney.

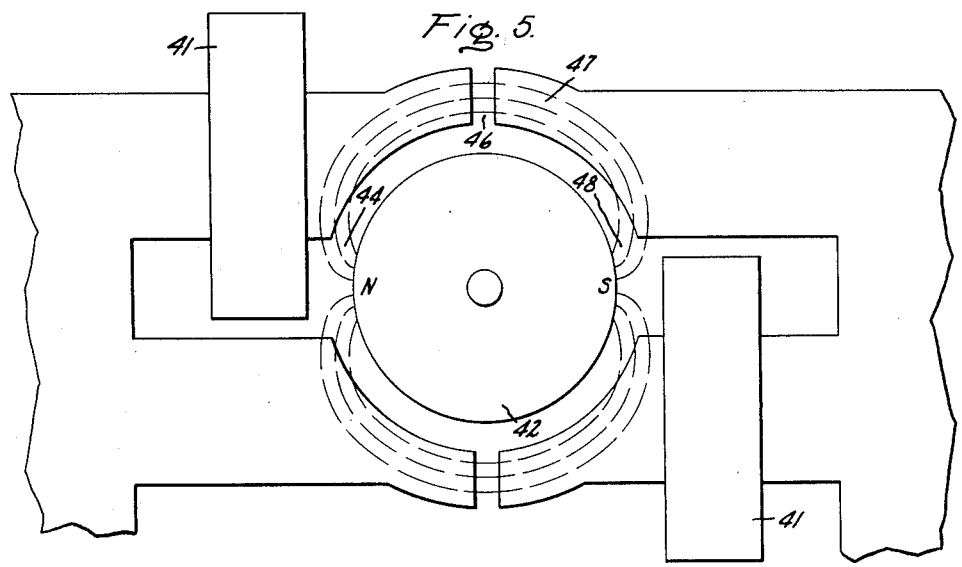
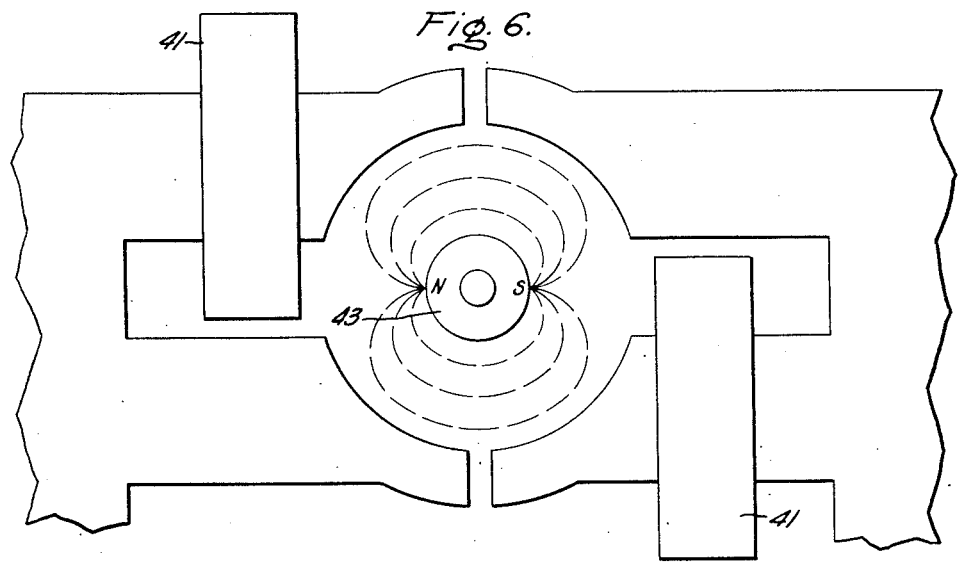

United States Patent Office 2,792,510
Patented May 14, 1957

2,792,510

MOTOR STRUCTURE

George L. de Wolf, Framingham Center, Mass., assignor to General Electric Company, a corporation of New York Application January 25, 1956, Serial No. 561,289

10 Claims. (Cl. 310—163)

This invention relates to small synchronous motors of very high efficiency with very low power input requirements.

In a copending application of Theodore Dreier and Ira A. Terry, application Serial No. 511,017 filed May 25, 1955, and assigned to the same assignee of the present invention, there is disclosed a cordless, synchronous electric clock which is driven from a local A. C. power source within the clock case, for example, by a battery-powered oscillator. As described in the above-mentioned application, the frequency of the local power source is synchronized with the commercial power frequency by deriving a signal by means within the clock from induction fields, either electric or magnetic inevitably present, for example, as stray fields existing in the general vicinity of low frequency commercial power lines. Since the oscillator and amplifier disclosed in the copending application are battery driven, it is especially desirable to use a clock motor having very high efficiency with very low power requirements in the system in order to prolong the useful life of the batteries used.

As is well-known, small synchronous motors of the permanent magnet rotor type are sometimes employed in electric clocks. However, since the rotors of these motors are so closely spaced to their surrounding stator structure that the minimum reluctance flux path of the permanent magnet rotor is through the closely adjacent stator structure, I have found that these rotors exhibit a tendency to lock which increases their minimum power requirements.

Accordingly, it is a principal object of this invention to provide an improved, small synchronous motor of very high efficiency with very low power requirements. However, it is to be understood that my improved motor is not confined for use with the cordless clock system mentioned above, but may be used in other systems where very high efficiency with low power requirements are necessary or desirable.

It is a further object of this invention to provide a self-starting synchronous motor.

In accordance with one aspect of this invention, an electromagnetic stator structure for producing an alternating flux field is provided with a plurality of spaced poles. A rotor is positioned between the spaced poles of the stator structure so as to leave a relatively large air gap between the rotor and the stator. The air gap is so proportioned that the minimum reluctance path for the magnetic flux of the rotor is completely through air rather than partially through air and partially through the surrounding stator structure. By this arrangement, the tendency of the rotor to lock, that is, to align its magnetic poles with the magnetically attractable portions of the field structure and particularly the field structure poles is substantially alleviated.

Other objects and attendant advantages of this invention will be apparent from the following description taken in connection with the accompanying drawing in which:

Fig. 1 is a back elevational view partially in cross section of my improved motor;

Fig. 2 is a side elevational view of my improved motor;

Fig. 3 is an enlarged partial bottom plan view partially in cross section of my improved motor;

Fig. 4 is an unassembled view of the lapped joint of the stator structure of my improved motor;

Fig. 5 is a diagrammatic illustration of a well-known shaded pole type self-starting motor; and Fig. 6 is a diagrammatic illustration of a shaded pole type self-starting motor constructed in accordance with my invention.

Referring now to Fig. 1 of the drawing, there is illustrated a rotor 2 mounted for rotation between pole pieces 3 and 4 of an alternating field structure 1.

Field structure 1 is provided for producing an alternating flux field so as to cause rotation of rotor 2. In the arrangement illustrated, stator structure 1 consists of two laminated legs 5 and 6. Leg 5 is provided with two end portions 7 and 9, and in like manner, leg 6 is provided with two end portions 8 and 10. Legs 5 and 6 may be formed of a plurality of laminates 11, 12, 13, 14, 15 and 16. As shown in Fig. 4, laminates 11, 13 and 15 are longer than laminates 12, 14 and 16 in order to form a plurality of slots 17 and projections 18 on laminated end portion 8. In like manner, end portion 7 has a plurality of slots 19 and projections 20 formed thereon. The individual laminations of legs 5 and 6 may be cemented together along their flat surfaces, and holes 21 and 22 may be formed in legs 5 and 6 for connecting, respectively, the stator structure to suitable mounting means (not shown).

I provide means for connecting legs 5 and 6 to each other. As shown in Fig. 4 this comprises a hole 23 formed in projections 18 on end portion 8 and a similar hole 24 formed in projections 20 of end portion 7. The projections 17 formed on end portion 6 are inserted within recesses 19 formed on end portion 7. Bolt 25 is passed through openings 23 and 24 and a nut 26 is screwed thereon whereby to form a lapped joint.

The stator structure is provided with means for orienting the air gap flux pattern. In the arrangement illustrated, end portion 9 of leg 5 is provided with an inwardly directed pole piece 4. In like manner, end portion 10 of leg 6 is provided with a pole piece 3 directed toward pole piece 4. As shown in Figs. 1 and 3, pole pieces 3 and 4 are disposed opposite to each other and are relatively large with respect to rotor 2 so that the maximum possible flux cuts rotor 2. Windings 27 and 28 are disposed about legs 5 and 6, respectively, between end portions 7 and 9 of leg 5, and end portions 8 and 10 of leg 6 in a manner well-known in the art. As shown in Fig. 1, extremities 29 and 30 of pole pieces 3 and 4, respectively, are of circular configuration for receiving a portion 33 of motor casing 31.

I provide a substantially cylindrical casing 31 for enclosing and sealing rotor 2 and its associated bearing and lubricating means from dust, moisture, and other impurities present in the atmosphere. As shown in Fig. 3, casing 31 comprises a relatively large cylindrical portion 32 and a small cylindrical portion 33 concentric with each other and connected to each other by an annular wall 34 extending between the adjacent circular end portions of cylindrical portion 33 and cylindrical portion 32. The outermost end portion of cylindrical portion 33 is closed by a cap 35. A cap 36 fits inside cylindrical portion 32 and closes the outer end portion of cylindrical portion 32. As shown in Figs. 1 and 2, the small cylindrical portion 33 of casing 31 is held between pole pieces 3 and 4 and a portion of annular wall 34 located between cylindrical portions 32 and 33 abuts the outermost laminates of pole pieces 3 and 4.

By this arrangement, casing 31 is securely fixed between pole pieces 3 and 4. Disk 37 is concentrically located within cylindrical portion 33 of casing 31 for mounting rotor shaft bearing 39. A similar bearing arrangement, not illustrated, is provided for rotatably supporting the other end of rotor shaft 2a. In order to minimize frictional drag, the rotor shaft bearings may be jewel bearings and rotor shaft 2a may be formed from stainless steel. Casing 31 is preferably formed from plastic or other non-magnetic non-conducting material of constant permeability so that it is substantially unaffected by the magnetic field of the rotor and the magnetic field of the stator.

I provide a low inertia permanent magnet rotor 2 to be driven by the alternating flux field impressed between the poles of the stator structure. As shown in Fig. 3, rotor 2 is fixed on shaft 2a and is accurately positioned between pole pieces 3 and 4 by bearings 39. My improved rotor is substantially cylindrical and is preferably formed from molded magnetic oxide which is polarized across a diameter thereof so as to form diametrically opposed north and south poles indicated as N and S in Fig. 1. The flux lines between the north and south poles of rotor 2 have been indicated in Fig. 1 and it can be seen that the concentrated flux lines are spaced from the stator structure, and particularly pole pieces 3 and 4.

"Minimum reluctance path" is a comparative term referring to that single path of the magnetic flux from one rotor pole to an adjacent rotor pole of opposite polarity which presents the least reluctance to the flux lines emanating from such poles. More specifically, a comparison is drawn between the total reluctance of the path from one rotor pole through the adjacent field structure and back to the other rotor pole; and the alternate path through the air gap from one rotor pole to an adjacent rotor pole without passing through the field structure. It is rather obvious in the device shown in Fig. 1 that the path of minimum reluctance for the magnetic flux between the north and south poles of the rotor 2 is completely through the air surrounding rotor 2, or possibly the air and the non-magnetic casing 31. The path of minimum reluctance could not be from the north pole of the rotor to the stator structure through a portion of the stator structure, and then back to the south pole of the rotor since the circumferential distance around the outer periphery of the rotor is less than the sum of the air gaps from pole piece 3 to the rotor and from pole piece 4 to rotor 2. Suitable gearing (not shown) may be provided within casing 32 and connected to gear 40 for causing rotation of the hands of a clock, for example.

In operation, the small mass of rotor 2 and the high energy to weight ratio of magnetic oxide plays an important part in minimizing the power requirements as does the low permeability of the material. Pole tips 3 and 4 are sufficiently far apart that the minimum return flux path of the rotor is completely through air in order to minimize the tendency of the rotor to align its magnetic poles with the magnetically attractable poles of the field structure when the field structure is deenergized. If rotor 2 assumes the position shown in Fig. 1 when the field structure is deenergized, it can be seen that if pole 3 becomes south while pole piece 4 becomes north under the influence of a sufficiently strong alternating current, the north pole of the permanent magnet rotor 2 will be attracted toward pole piece 3 while the south pole of the permanent magnet rotor 2 will be attracted to pole piece 4 to cause permanent magnet rotor 2 to rotate in a clockwise direction. As pole pieces 3 and 4 change polarity, the north and south poles of rotor 2 will have rotated beyond an in-line position with the pole pieces 3 and 4, and pole piece 3 now being north, will exert a repulsive force on the north pole of the rotor to cause rotor 2 to continue to rotate in a clockwise direction. In like manner, pole piece 4 now being south, will exert a repulsive force on the south pole of the rotor to cause the rotor to continue to rotate in a clockwise direction.

While my improved motor shown in Fig. 1 may be self-starting if the strength of the stator field is adequate, self-starting may be sacrificed in order to lower the power requirements of the motor to prolong the useful life of batteries which, for example, may be used for supplying power to the field coils. Starting torque requirements are usually in excess of the torque requirements for sustaining rotation. If desired, my improved motor may be manually started by manually rotating rotor 2 in the desired direction of rotation. This may be accomplished by manually rotating a knob (not shown) which may be connected to gear 40 by conventional gearing.

In the event that it is desired to use my improved motor shown in Fig. 1 as a self-starting motor, unidirectional rotation can be assured by use of a spring type one-way drive, such as that disclosed by E. A. Phaneuf in Patent No. 2,633,950 dated April 7, 1953.

The well-known shaded pole type self-starting motor, diagrammatically illustrated in Fig. 5 will now be compared with a shaded pole motor constructed in accordance with my invention, diagrammatically illustrated in Fig. 6. The motors are self-starting, synchronous in operation, and generally start in that direction of rotation determined by the alternating flux field shift produced by shading coils 41 which surround two diametrically opposite poles of the field structure. Rotor 42, shown in Fig. 5, has been enlarged for illustrative purposes and operates in a conventional manner within a four pole shaded field structure; whereas rotor 43, shown in Fig. 6, has been decreased in size for illustrative purposes and operates in accordance with the principle of this invention. Rotors 42 and 43, shown in Figs. 5 and 6, respectively, are formed of magnetic oxide and are magnetized across the diameter thereof in the same manner as rotor 2 shown in Fig. 1. Flux lines have been drawn between the north and south poles of rotors 42 and 43 to illustrate graphically the minimum reluctance path. It can be seen that the minimum reluctance flux path of rotor 42, shown in Fig. 5, is partially through air and partially through the field structure. Specifically, the flux path extends from the north pole across air gap 44 between the rotor and the shaded field structure, across air gap 46, through field structure portion 47, and then across air gap 48 to the south pole of the rotor. In the device shown in Fig. 6, the path of minimum reluctance is entirely through air rather than through air and a portion of the surrounding field structure. Most of the flux merely flows between the north pole and the south pole of the rotor greatly reducing the tendency to lock. When the path of minimum reluctance is partially through the field structure, the rotor poles will tend to line up very strongly with the magnetically attractable material of the surrounding field structure when the field structure is deenergized. That is, as shown in Fig. 5, the positive and negative poles of the rotor will line up with the pole pieces of the field structure so that when the field structure is energized, the strength of the rotating field produced must be greater than the static locking torque to start the rotor and considerable power will be required to cause the rotor to rotate. In contrast with this, as shown in Fig. 6, when the path of minimum reluctance is entirely through air, the permanent magnet rotor does not have anywhere near as much tendency to line up with the stator pole pieces. Hence, when the stator structure is energized the static force on rotor 43 will not be nearly so strong and the rotating field can more readily cause the rotor to rotate. Motors were constructed in accordance with the diagrammatic illustrations of Figs. 5 and 6 and it was found that the motor constructed in accordance with the principles of the motor shown in Fig. 6 showed good starting torque characteristics while the conventional size rotor motor shown in Fig. 5 exhibited a tendency to lock and had poor starting torque characteristics.

The following indicates the actual dimensions of the motors tested:

*Fig. 5*

| | |
|---|---|
| Field structure inner diameter | 5/8" |
| Rotor diameter | 5/16" |
| Air path | 5/16" |
| Field air gap | 1/16" |
| Minimum air path when flux follows field structure. | 6/16" = .375" |
| Minimum air path around rotor | 5/16" × 3.1416 ÷ 2 = .49" |

*Fig. 6 motor 1/4 in. diameter rotor*

| | |
|---|---|
| Field structure inner diameter | 5/8" |
| Rotor diameter | 1/4" |
| Air path | 3/8" |
| Field air gap | 1/16" |
| Minimum air path when flux follows field structure. | 7/16" = .437" |
| Minimum air path around rotor | 1/4" × 3.1416 ÷ 2 = .393" |

It is clearly apparent that with the 1/4" diameter rotor 43 the minimum distance around the periphery of the rotor is less than the minimum air path for the flux of the rotor when the flux follows the field structure. Hence, the path of minimum reluctance in this motor is through the air path around the rotor and this rotor does not exhibit a strong tendency to lock. However, with the 5/16" diameter rotor 42, the minimum air path around the rotor, that is the circumferential distance around the outer periphery of the rotor from the north pole to the south pole of the rotor, is greater than the minimum air path when the flux follows the field structure. The path of minimum reluctance in this case in through the field structure and the north-south poles of the rotor tend to line up very strongly with the poles of the stator when the stator is deenergized, thereby making this rotor difficult to start.

The same locking torque which causes difficulty in starting, also, affects the power requirements of the motor while it is running. Though it is true that the average locking torque when the motor is running is zero, it does not follow that, therefore, it has no effect on the motor operation. This locking torque produces forces assisting the rotor as it approaches alignment with the poles of the stator and retarding the rotor as it passes the alignment points. The only way the rotor can compensate for these changes in torque requirements is by alternately shifting from a leading to a lagging phase angle, and this, in turn, produces a hunting action superimposed on the average synchronous speed. As long as this hunting takes place within the phase angle for stable operation, the rotor will operate satisfactorily, but if the total angle is too large for constant stability or if it is so large that the other load variables such as friction take the rotor into an unstable region, it will simply cease to operate.

The optimum size and strength for the rotor within the limitations already described will be determined by the operating conditions under which it is to be used. As the rotor size is decreased below the point where the minimum reluctance return flux path is no longer through the field structure, the locking tendency will decerase still further but so will the torque produced by the rotating field. For any operating voltage, an optimum balance between these two forces can be reached which will result in maximum operating efficiency for these conditions.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. A synchronous motor comprising an electromagnetic stator structure having a plurality of spaced poles and a multipolar rotor located between said spaced poles so as to leave an air gap between said rotor and said stator, the air gap between said rotor and stator being such that the minimum reluctance path for the magnetic flux of the rotor is completely through air whereby to minimize the tendency of the rotor to align its magnetic poles with a line connecting the poles of the stator.

2. A self-starting synchronous motor comprising an electromagnetic stator structure having a plurality of spaced poles and a multipolar rotor located between said spaced poles so as to leave an air gap between said rotor and said stator, the size of the rotor being such that the minimum air path around the rotor from the north pole of the rotor to the south pole of the rotor is less than the minimum air path for the flux of the rotor when the flux follows the field structure.

3. A self-starting synchronous motor comprising a stator field structure having a plurality of spaced poles for producing an alternating flux field, a cylindrical rotor located between said spaced poles so as to leave an air gap between said rotor and said stator, said rotor being polarized across a diameter thereof, and size of said rotor being such that the minimum reluctance return flux path for the magnetic flux of the rotor is through the surrounding air.

4. A synchronous motor comprising a stationary field structure having a plurality of spaced poles for producing an alternating flux field, a multipolar rotor spaced within the influence of this field, said rotor being formed from a material of high magnetic strength to weight ratio, said rotor being so disposed in said stationary field so that the minimum distance around the outer periphery of the rotor from one pole to the opposite pole thereof is less than twice the air gap between the rotor and the stator.

5. A self-starting synchronous motor comprising a stator field structure having a plurality of spaced poles for producing an alternating flux field, a multipolar rotor spaced within the influence of this field, said rotor being formed from a material of high magnetic strength to weight ratio, said rotor being so mounted so that the minimum distance around the outer periphery of the rotor from one pole to the opposite pole thereof is less than twice the air gap between the rotor and the stator.

6. A synchronous motor comprising a pair of laminated legs each having two end portions, a plurality of slots and projections formed on one end portion of each of said legs, the projections formed on one of said legs being disposed within the slots formed on the other of said legs whereby to connect one of the ends of each of said legs to each other, pole pieces directed toward each other and spaced from each other formed on the other end portion of each of said legs, windings disposed about each of said legs between said end portions, and a permanent magnet rotor located between said spaced pole pieces so as to leave an air gap between said rotor and said stator, said rotor being polarized across the diameter thereof, and the size of said rotor being such that the minimum reluctance return flux path for the magnetic flux of the rotor is through the surrounding air.

7. A synchronous motor comprising a field structure including a pair of generally L-shaped laminated legs each having an elongated generally vertical arm and a short horizontal arm, a plurality of slots and projections formed on one end of each of said elongated arms, the projections formed on one of said elongated arms being disposed within the slots formed on the other of said elongated arms whereby to connect one of the ends of each of said elongated arms to each other, said short generally horizontal arms forming pole pieces directed toward each other, preformed windings disposed about each of said elongated arms, and a permanent magnet rotor located between said pole pieces, the pole pieces being relatively large with respect to the rotor so that the maximum possible flux of the field structure cuts the rotor.

8. A synchronous motor comprising a field structure including a pair of laminated legs each having two end portions, a plurality of slots and projections formed on one end portion of each of said legs, the projections formed on one of said legs being disposed within the slots formed on the other of said legs whereby to connect one of the ends of each of said legs to each other, pole pieces directed toward each other and spaced from each other formed on the other end portion of each of said legs, windings disposed about each of said legs between said end portions, a cylindrical rotor polarized across a diameter thereof located between said spaced pole pieces so as to leave an air gap between said rotor and said pole pieces, and the strength and size of said rotor being such that minimum reluctance return flux path of the rotor is not through the field structure.

9. A self-starting synchronous motor comprising an electromagnetic stator structure having a plurality of spaced poles, a shading coil surrounding one of said spaced poles, and a multipolar rotor located between said spaced poles so as to leave an air gap between said rotor and said stator, the size of the rotor being such that the minimum air path around the rotor from the north pole of the rotor to the south pole of the rotor is less than the minimum air path for the flux of the rotor when the flux follows the field structure.

10. A self-starting synchronous motor comprising a stator field structure having a plurality of spaced poles for producing an alternating flux field, a shading coil surrounding one of said spaced poles, and a rotor spaced within the influence of the field, said rotor being formed from non-conducting material of high magnetic strength to weight ratio, said rotor being so mounted as to prevent the major portion of its return flux lines from cutting any conducting material.

References Cited in the file of this patent
UNITED STATES PATENTS

| | | |
|---|---|---|
| 1,259,561 | Russ et al. | Mar. 19, 1918 |
| 1,283,435 | Warren | Oct. 29, 1918 |
| 2,214,850 | Arey | Sept. 17, 1940 |